United States Patent [19]

Matthies

[11] Patent Number: 5,664,900
[45] Date of Patent: Sep. 9, 1997

[54] DOWEL JOINT SYSTEM FOR CONNECTING ELEMENTS OF A SOLID MATERIAL

[76] Inventor: Klaus E. Matthies, 197 Hanley Crescent, Regina Saskatchewan, Canada, S4R 5A9

[21] Appl. No.: 624,654

[22] Filed: Mar. 22, 1996

Related U.S. Application Data

[63] Continuation-in-part of Ser. No. 235,945, May 2, 1994, abandoned, which is a continuation of Ser. No. 887,756, May 28, 1992, abandoned.

[51] Int. Cl.$^6$ ..................................................... F16B 13/06
[52] U.S. Cl. .......................... 403/297; 403/292; 403/267; 408/153; 408/158; 411/24; 411/82
[58] Field of Search ......................... 403/292, 294, 403/404, 297, 265, 268, 267, 231, 361; 408/153, 159, 154; 411/82, 24, 909

[56] References Cited

U.S. PATENT DOCUMENTS

| 148,276 | 3/1874 | Allen | 403/297 |
|---|---|---|---|
| 162,001 | 4/1875 | Allen | 403/361 |
| 187,862 | 3/1877 | Cantrell | 403/297 X |
| 201,378 | 3/1878 | Allen | 403/297 X |
| 456,391 | 7/1891 | Andrus | 411/24 |
| 752,669 | 2/1904 | Guzwoski | 411/82 |
| 1,555,242 | 9/1925 | Foster | 403/297 |
| 2,008,352 | 7/1935 | Fegley | 403/297 |
| 2,011,529 | 8/1935 | Shaw | 403/297 |
| 2,100,873 | 11/1937 | Roberts | 403/297 X |
| 2,104,496 | 1/1938 | Schaefer | 403/297 |
| 2,541,537 | 2/1951 | Newcomb | 408/158 |
| 2,817,620 | 12/1957 | Golick | 403/292 |
| 3,791,750 | 2/1974 | Cameron | 403/297 |
| 4,529,022 | 7/1985 | Jacobson | 408/159 |

FOREIGN PATENT DOCUMENTS

| 2346280 | 3/1975 | Germany | 408/159 |
|---|---|---|---|
| 3206678 | 9/1983 | Germany | 408/239 R |
| 191706 | 9/1985 | Japan | 408/153 |
| 1184106 | 3/1970 | United Kingdom | 408/159 |

*Primary Examiner*—Anthony Knight
*Attorney, Agent, or Firm*—Adrian D. Battison; Murray E. Thrift

[57] ABSTRACT

A system for fastening a dowel to a wooden element includes a drilling assembly for forming a blind hole in the wooden element which includes a first portion which is cylindrical and a second portion which tapers outwardly in frusto conical shape from the lower end of the first portion. A dowel having initially a cylindrical shape is inserted into the blind hole and then expanded outwardly into the frusto conical portion. The expansion can be carried out by a tapered plug which is forced into the end of the dowel, by a wedge member which is forced into slits in the end of the dowel or by expansion of the dowel itself from an initial compressed position by absorption of moisture from an adhesive. The drilling is effected by a compound drilling assembly which includes a first and second drilling element, the latter being movable axially relative to the former with the axial movement causing the latter to move outwardly along the frusto conical shape to form the second frusto conical portion after the first element drills to the required depth of the hole of the bore.

23 Claims, 9 Drawing Sheets

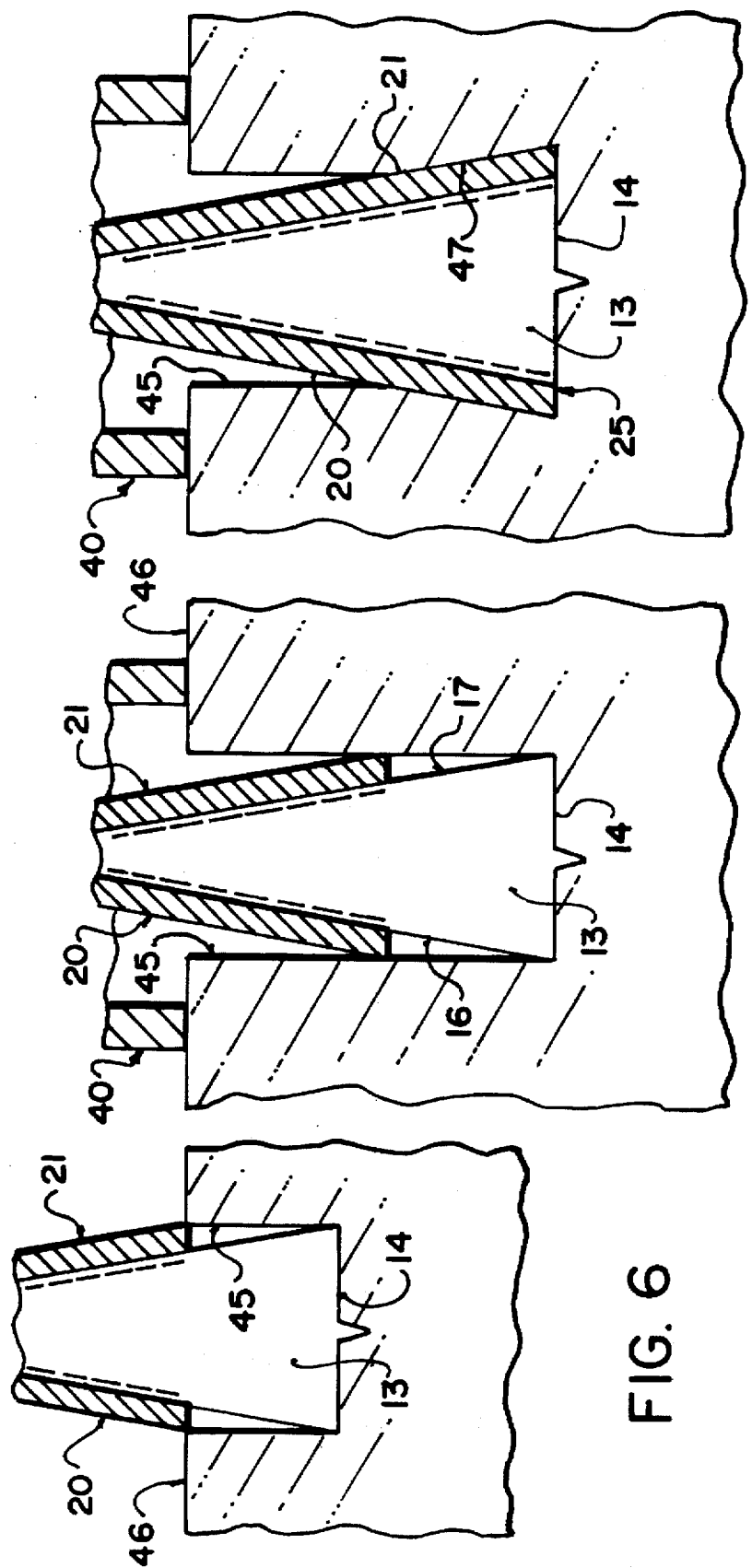

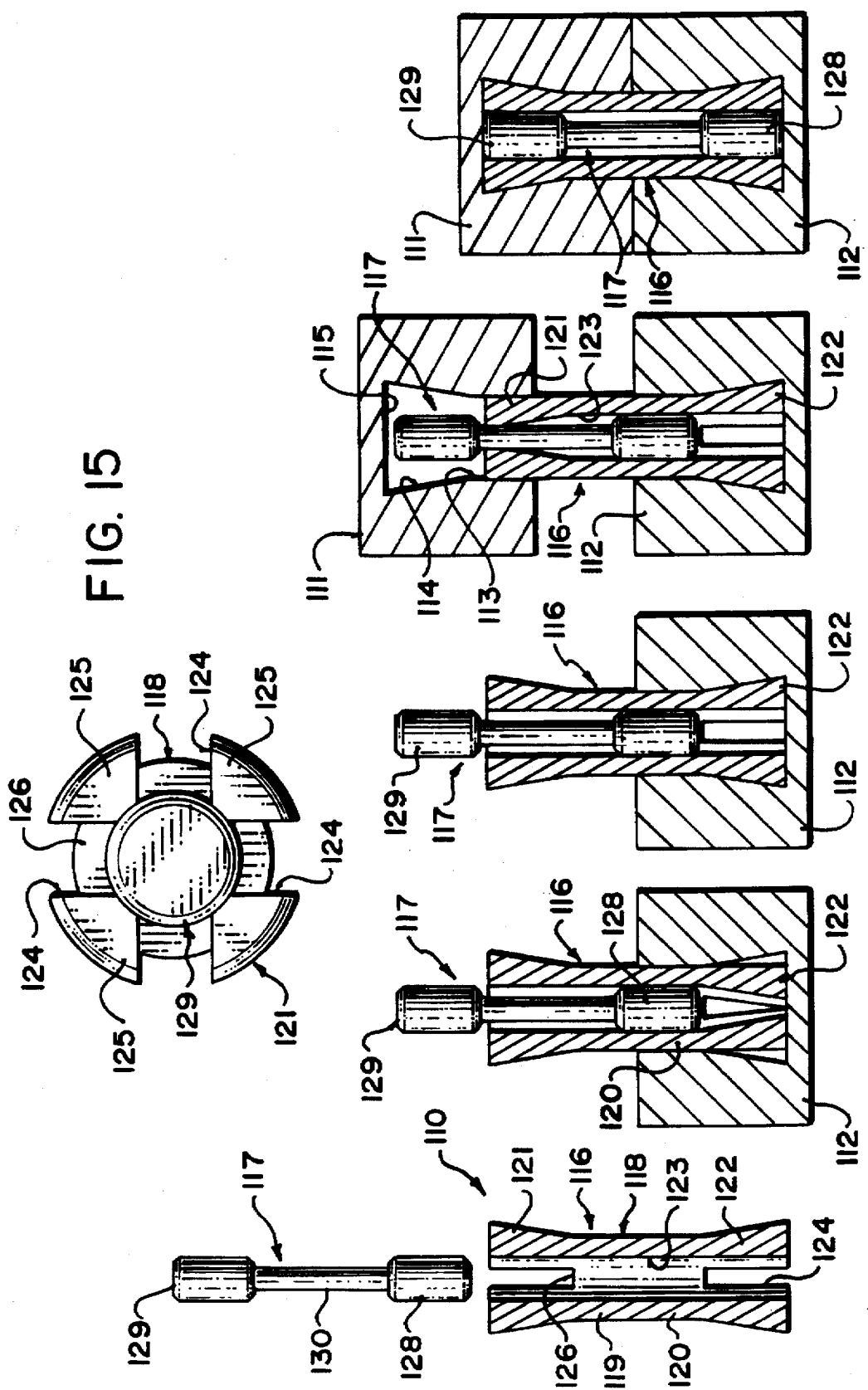

DOWEL JOINT SYSTEM FOR CONNECTING ELEMENTS OF A SOLID MATERIAL

This application is a continuation-in-part application of application, Ser. No 08/235,945, filed May 2nd, 1994 which is a continuation application of application, Ser. No. 07/887,756, filed May 28th 1992 both of which are now abandoned.

BACKGROUND OF THE INVENTION

This invention relates to a dowel joint system for connecting elements of a solid material including a method for connecting a dowel to a wooden element, a dowel for use in the method and to a drill bit for forming a required hole for the system.

Various techniques have previously been proposed for connecting elements of a solid material such as wood in the manufacture of furniture and similar wooden constructions. One simple widely used technique is the use of a dowel which is inserted into blind holes drilled into the wooden elements so that the dowel bridges the abutting surfaces between the two elements and extends into each of the blind holes. The dowel is generally cylindrical and is a tight friction fit within the blind holes and is supplemented by the provision of adhesive which is intended to hold the two elements fully connected together.

However some cases the connection is not sufficient to accommodate the forces involved and breakage or loosening of the joint can occur.

SUMMARY OF THE INVENTION

It is one object of the present invention to provide an improved dowel connection system for connecting two elements of a solid material.

According to the first aspect of the invention there is provided a method of fastening a dowel to an element of a solid material comprising drilling a blind hole in the element from a surface of the element, the blind hole having a first portion spaced from the surface which is of diameter greater than that of a second portion thereof closer to the surface, inserting a cylindrical end of the dowel into the blind hole through the surface, the cylindrical end having a diameter substantially equal to that of the second portion and causing a part of the cylindrical end to expand radially into said first portion of the hole.

According to a second aspect of the invention there is provided a dowel for use in fastening to an element of a solid material comprising an elongate body having a cylindrical portion for insertion into a blind hole in the element, a part of the cylindrical portion at one end of the body being expandable radially outwardly so as to increase in diameter.

According to a third aspect of the invention there is provided a drilling assembly for attachment to a rotary drive member for drilling a blind hole having a first cylindrical portion and a second substantially outwardly tapered frusto-conical portion comprising a first drilling element and a second drilling element, means holding the first and second elements in fixed relationship for common rotation to form the first portion which is cylindrical and means to cause subsequent movement of the second element relative to the first element to cause the second element to form said second portion which is substantially frusto-conical.

The formation of the blind hole therefore with a portion within the hole which increases in diameter preferably in a frusto-conical shape enables a dowel which expands into the same shape to be locked into place and held by the physical interelation between the materials rather than simply by the friction fit and adhesive techniques of the conventional arrangement.

One or more embodiments of the invention will now be described in conjunction with the accompanying drawings.

BRIEF DESCRIPTION OF THE DRAWINGS

FIG. 6 is a cross sectional view through a lower part of the drilling assembly of FIG. 1 showing the drilling assembly in operation drilling a hole in a wooden element.

FIG. 7 similar view to that of FIG. 6 showing a subsequent stage the drilling process.

FIG. 8 is a view similar to that of FIGS. 6 and 7 showing a yet further stage of the drilling process.

FIGS. 14A through 14E show a series of steps of insertion of a dowel and associated plug member into two parts of material to be connected.

FIG. 15 is an end elevational view of the dowel and plug member of FIGS. 14A through 14 E.

In the drawings like characters of reference indicate corresponding parts in the different figures.

DETAILED DESCRIPTION

Figure 1:
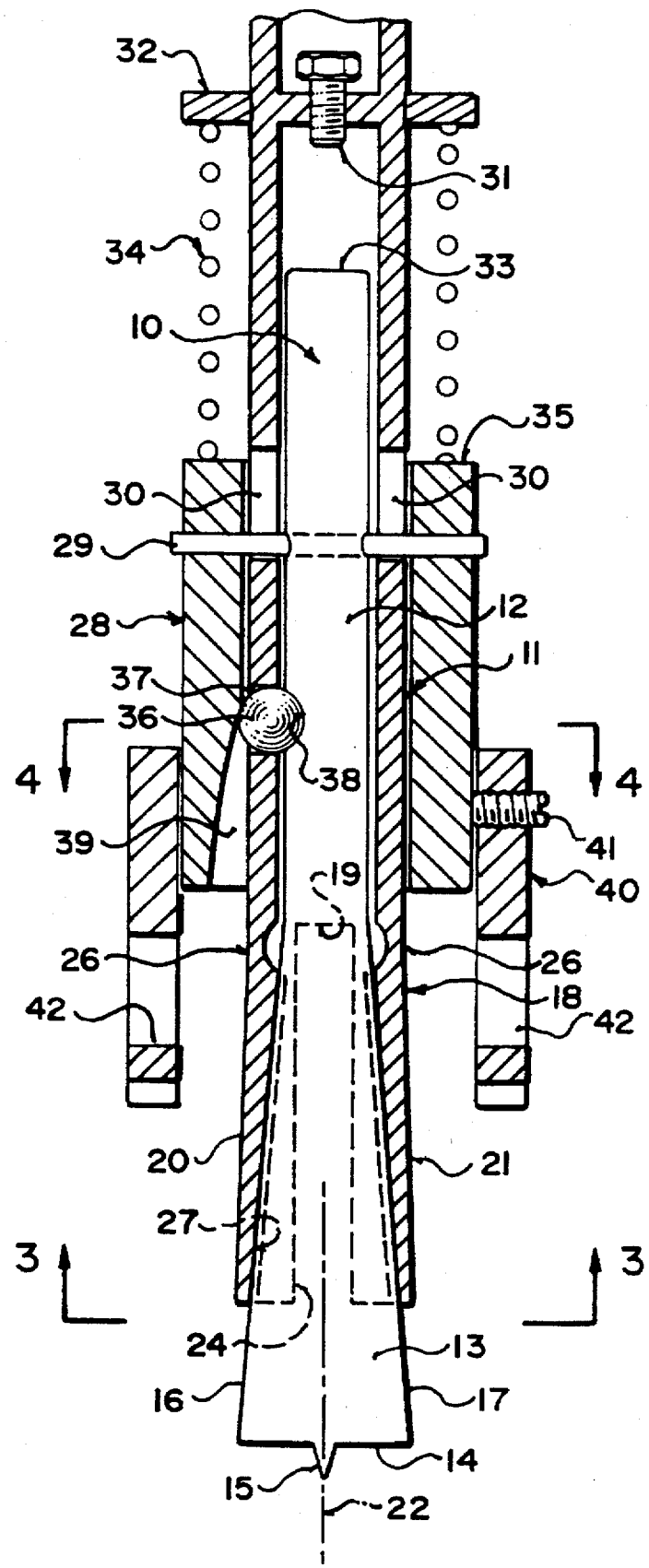
FIG. 1 is a vertical cross sectional view through a combination drilling assembly for drilling a blind hole of the required shape for the present system.

A drill bit assembly as shown in FIG. 1 through 4 which is arranged for drilling a blind hole in a wooden element with the blind hole having a first cylindrical portion at the surface through which the drilling takes place and a second outwardly frustoconical potion axial with the first portion and commencing at the inner end of the first portion.

The drilling assembly includes a first drilling element 10 and a second drilling element 11. The first drilling element 10 comprises an elongate rod portion 12 with a lower drill bit 13 attached to the rod portion and extending axially therefrom to a cutting edge 14 of conventional construction. As shown the drill bit 13 includes a spade type cutting edge 14 including a central point element 15. Alternatively the drilling bit 13 can be of the helical screw type. In both cases the drill bit includes two or more diametrically opposed side edges 16 and 17 which extend longitudinally of the drill bit and act as guide surfaces for the second drilling element 11.

Figure 3:
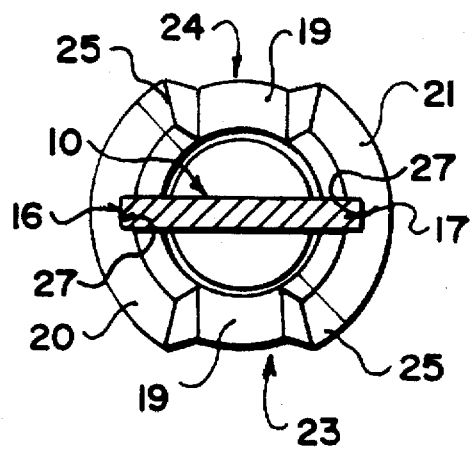
FIG. 3 is a cross sectional view along the lines 3—3 of FIG. 1.
Figure 4:
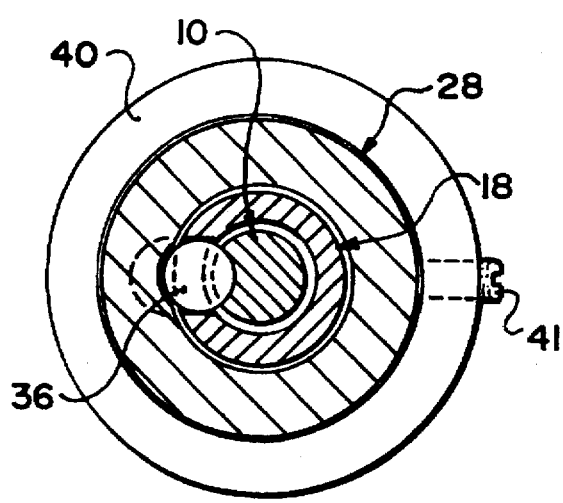
FIG. 4 is a cross sectional view along the lines 4—4 of FIG. 1.

The second drilling element 11 includes an elongate sleeve portion 18 surrounding the rod portion 12 and slidable longitudinally relative thereto. At a lower end 19 of the tube 18 is provided a pair of drill bit elements 20 and 21 each of which is integrally connected with the lower edge 19 of the tubular portion and extends downwardly therefrom. Each of the cutting elements 20 and 21 is substantially arcuate as best shown in FIG. 3 and extends only partly around the axis indicated at 22 so as to define open areas 23 and 24 therebetween. Each of the cutting elements includes a cutting edge 25 extending in a cutting direction angularly surrounding the axis 22 so that as the two elements 20 and 21 are rotated about the axis a cutting action occurs in an annulus defined by the path of the cutting edges 25.

Each of the arcuate cutting elements 20 and 21 is connected to the adjacent edge 19 of the tubular section by a spring portion 26 which allows the cutting elements to flex outwardly. Each of the cutting elements includes a longitudinally extending groove 27 within which a respective one of the edges 16 and 17 is received for co-rotation of the edges 16 and 17 and the cutting element 20 and 21 about the axis and for axial sliding movement of the cutting element 20 and 21 along the edges 16 and 17.

The first cutting element 10 is interconnected with an outer collar 28 surrounding the tubular section of the second drilling element by a transverse pin 29 which passes through the rod portion 12 and into the sleeve 28 to hold those elements for common rotation about the axis 22 and for common longitudinal movement. The pin 29 passes through a pair of slots 30 in the tubular section 18 so that the pin maintains the first and second drilling elements for co-rotation but allows some longitudinal movement of the second drilling element relative to the first by an amount determined by the length of the slots 30. An end stop screw 31 is carried in the transverse plate 32 attached to the tubular portion 18 at right angles thereto. The end stop screw 31 engages an upper face 33 of the first drilling element to halt longitudinal movement between the first and second drilling elements at a required adjustable position. A spring 34 extends between the underside of the plate 32 and a top face 35 of the sleeve 28. The spring thus biases the sleeve and the first spring element in a direction downwardly as shown in FIG. 1 to take up the initial position of the assembly as shown in FIG. 1. A locating ball 36 is positioned in a hole 37 defined in the tubular portion 18. The ball in the initial position projects into a recess 38 in the rod portion 12 to hold the tubular portion 18 and the rod portion 12 in fixed position relative to each other for common rotational and axial movement. The ball 36 can however be received within a channel 39 forming a gradually increasing depth from an upper end to a lower end thereof so that while the ball is maintained within the opening 37 it can be released from a recess 38 by moving outwardly into the channel 39. In the upper most position of the channel as shown in FIG. 1 the ball is forced into the recess 38 to hold the elements in fixed common position. In the position shown in FIG. 2 the ball is released into the channel 39 allowing axial movement of the first drilling element relative to the second drilling element.

A rub collar 40 is attached to the lower end of the sleeve 28 and surrounds the sleeve 28 in fixed position by a set screw 41. The rub collar 40 includes a plurality of transverse openings 42 which allow the escape of chippings from the interior of the rub collar when the rub collar is in engagement with the surface of the wooden element being drilled. The axial location of the rub collar can be adjusted relative to the sleeve 28 by operation of the set screw 41.

In operation of the drilling assembly, the first and second drilling elements in the position shown in FIG. 1 engage the surface of the wooden element to be drilled and are rotated by a drive member attached to the upper end of the tubular portion 18 at the cross plate 32. Downward pressure from the rotary drive member presses the edge 14 into the wooden element to be drilled due to pressure through the tubular portion 18 and through the ball lock 36,37,38. The cutting edge 14 thus commences the cutting of a first portion 45 of the drilled bore as shown in FIG. 6. The drilling action continues to the position shown in FIG. 7 in which the cutting elements 20 and 21 enter into the bore 45 formed by the cutting edge 14. The outside edge of the cutting elements 20 and 21 is arranged to be equal to the width of the cutting edge 14 so that no further cutting occurs as the cutting elements 20 and 21 follow the cutting edge 14 into the bore 45.

This drilling continues until the rub collar 40 reaches the surface 46 of the element being drilled. This rub collar thus halts further forward movement of the rub collar and the first drilling element 13 which is attached thereto by the pin 29.

Further pressure on the rotary drive member thus presses down upon the second drilling element 11 which then tends to move downwardly relative to the first drilling element and the rub collar 40. This downward movement releases the ball 36 from the recess 38 so that the tubular portion 18 and the whole of the second drilling element can then move downwardly. This downward movement moves the second drilling element and particularly the cutting elements 20 and 21 longitudinally of the first drilling element. This longitudinal movement causes the cutting elements 20 and 21 to move along the side edges 16 and 17 of the first drilling element cutting portion 13. The side edges 16 and 17 diverge outwardly from the axis 22. These edges thus cause the cutting elements 20 and 21 to diverge outwardly as they slide longitudinal along the edges 16 and 17. This outward movement causes the lowermost cutting edge 25 of the cutting elements 20 and 21 to form a frustoconical bore section 47 at the lower end of the bore portion 45 with the frustoconical section diverging outwardly at the angle of the side edges 16 and 17.

Figure 2:
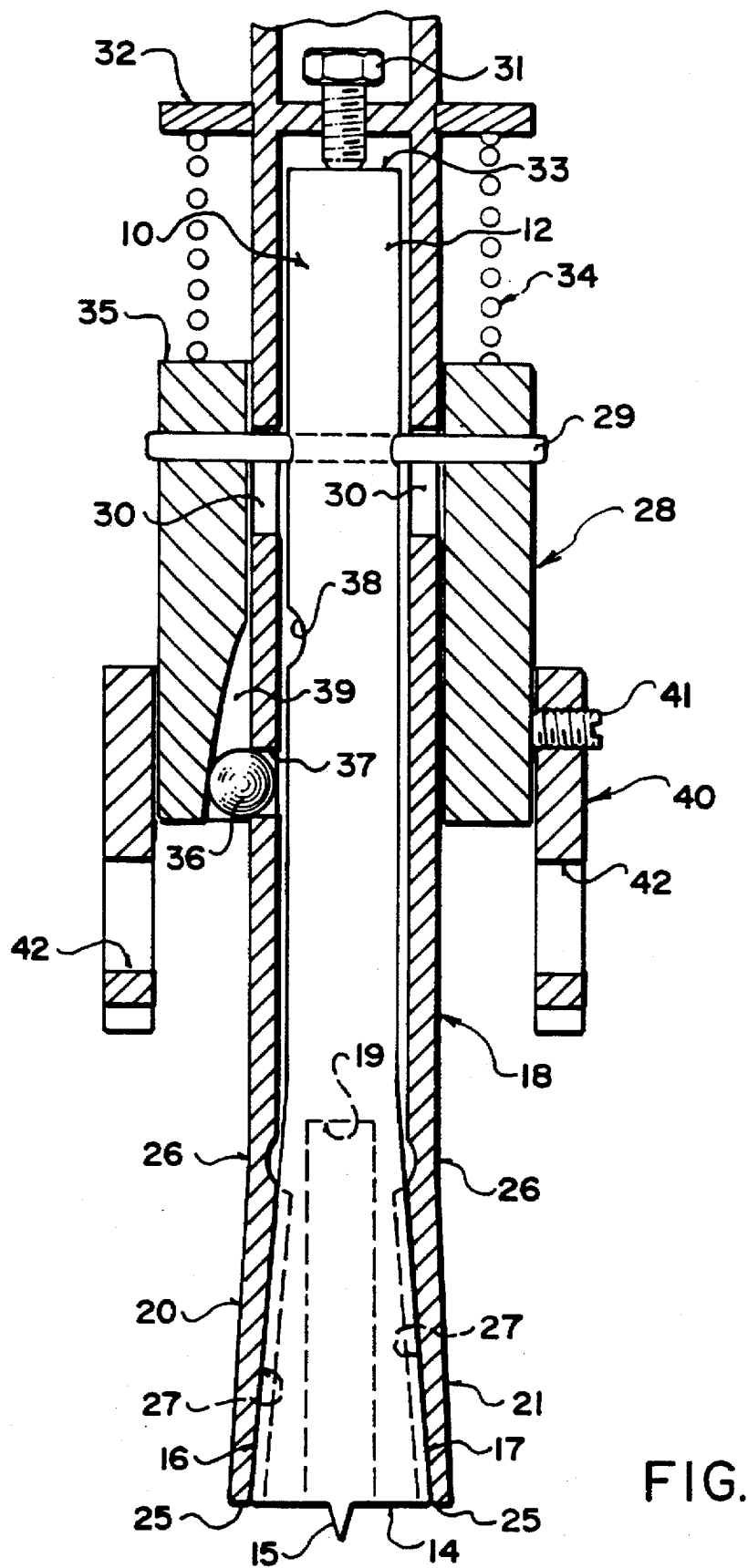
FIG. 2 is a cross sectional view similar to that of FIG. 1 showing the combined drilling assembly in a second position.

This drilling is completed when the assembly takes up a position shown in FIG. 2 in which the upper end of the rod 12 engages the lower end of the set screw 31. This position is adjusted so that the edges 25 are positioned relative to the cutting edge 14 to provide a smooth flat circular end for the bore, excluding of course the pointed centre section defined by the projection 15.

Figure 9:
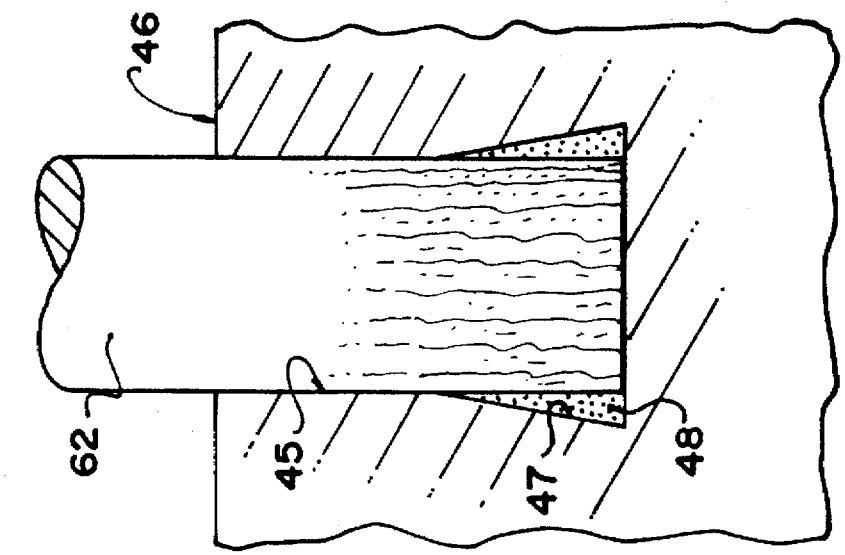
FIG. 9 is a cross sectional view through a wooden element showing a first stage in the insertion of a dowel for attachment to the wooden element.

When the drilling is complete the release of pressure from the rotary drive member onto the tubular portion 18 causes the spring 34 to force the tubular portion upwardly relative to the first drilling element to return to the position shown in FIG. 1. In this position the whole of the drilling element can simply be pulled from the drilled bore including the portions 45 and 47 as shown in FIG. 9.

The rub collar thus acts as a stop to accurately and adjustably set the depth of the bore. The length of the frustoconical portion 47 is fixed by the state of movement of the second element relative to the first. The length of the cylindrical portion is adjustable by moving the rub collar relative to the sleeve and thus relative to the first element.

After drilling of the bore is complete, a dowel generally indicated at 50 can be attached into the bore. The dowel is also visible in FIG. 12 where the dowel is used to attach a first element 51 of wood to a second element 52 using two of the blind holes drilled end to end as indicated at 45, 47 and 45A, 47A.

The dowel 50 comprises a cylindrical tubular body having a cylindrical outer surface 53 and a hollow cylindrical bore 54. In addition the dowel is cut with a plurality of transverse slots 55 which are cut to a depth equal to the axial length of the second bore portion 47. A number of such slits can vary from a minimum of four arranged at 90° spacing upward, bearing in mind the requirement of course to leave a significant amount of material forming the dowel at the end portion containing the slits.

Figure 10:
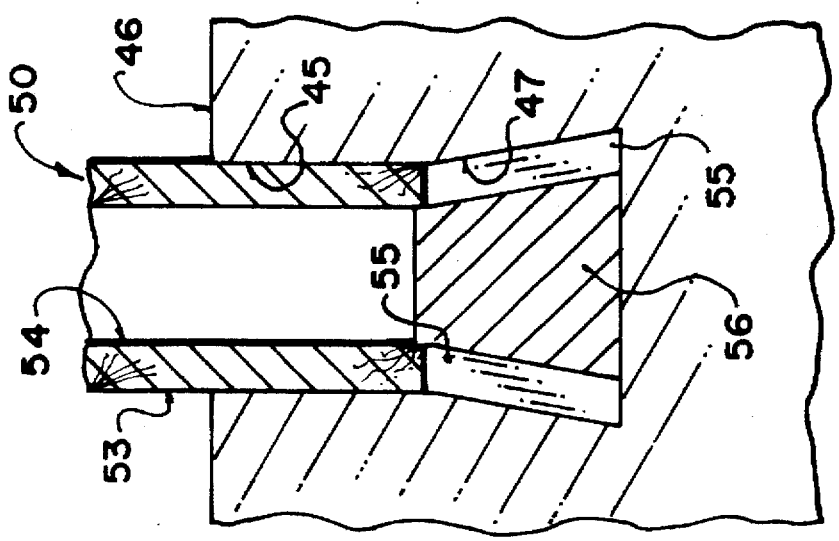
FIG. 10 is a similar cross sectional view through that of FIG. 9 showing a final stage in the insertion of the dowel element of FIG. 9.
Figure 12:
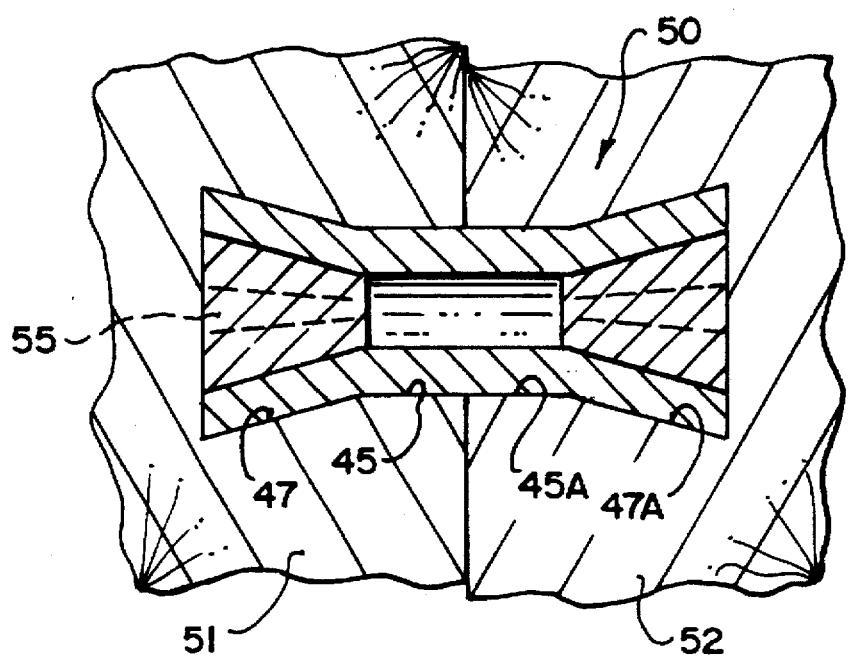
FIG. 12 is a cross sectional view through two abutting wooden elements showing the assembled dowel system in place therein.

A plug member 56 is provided with an upper end of the plug member just inserted into the end of the bore 54 at the outer end of the slits 55. The plug 56 is frusto conical in shape following the angle of the frustoconical end portion 47 of the bore. The end plug 56 is just inserted sufficiently into the bore to have frictional engagement therewith so that it is carried by the dowel into the bore to a position shown in FIG. 9 in which the end face of the frusto conical plug member 56 engages the lower face of the bore 47. From this position axial movement of the dowel 50 forces the dowel into the bore and at the same time forces the plug 56 into the bore 54 of the dowel. As the dowel is slit by the transverse slit 55, the dowel can be forced open at the slit so as to expand radially to take up the position shown in FIG. 10 in which the end portion of the dowel which is slit is expanded to follow the frusto conical shape defined by the inside surface of the bore portion 47 and the outside surface of the plug 56. As shown in FIG. 12, the slits 55 thus widen. The dowel is formed of material which allows the flexing necessary at the lower end of the slits without cracking of the material. Prior to insertion the bore can receive an adhesive material to assist in engagement of the dowel with the bore. However this expansion within the bore provides a physical engagement between the bore and the dowel which prevent the dowel from being pulled longitudinally out of the bore without physical damage to one of the parts.

In an alternative arrangement of the dowel (not shown), the plug can be of cylindrical shape and the inside bore of the dowel can be formed of frustoconical shape tapering inwardly toward the end face of the dowel so that the insertion of the cylindrical plug from the upper end of the dowel downwardly toward the base of the bore forces the end of the dowel outwardly into the frusto conical bore portion 47.

Figure 11:
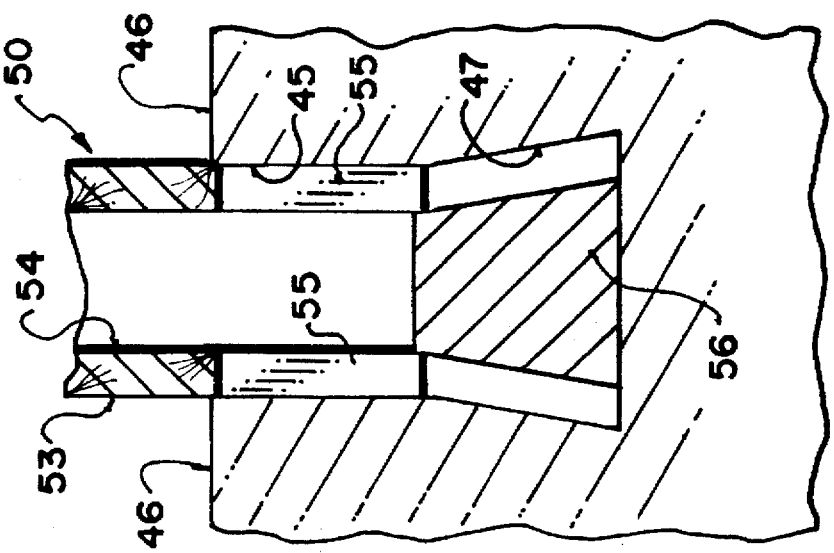
FIG. 11 a similar cross sectional view showing a modified dowel arrangement inserted into a drilled hole according to the present invention.
Figure 13:
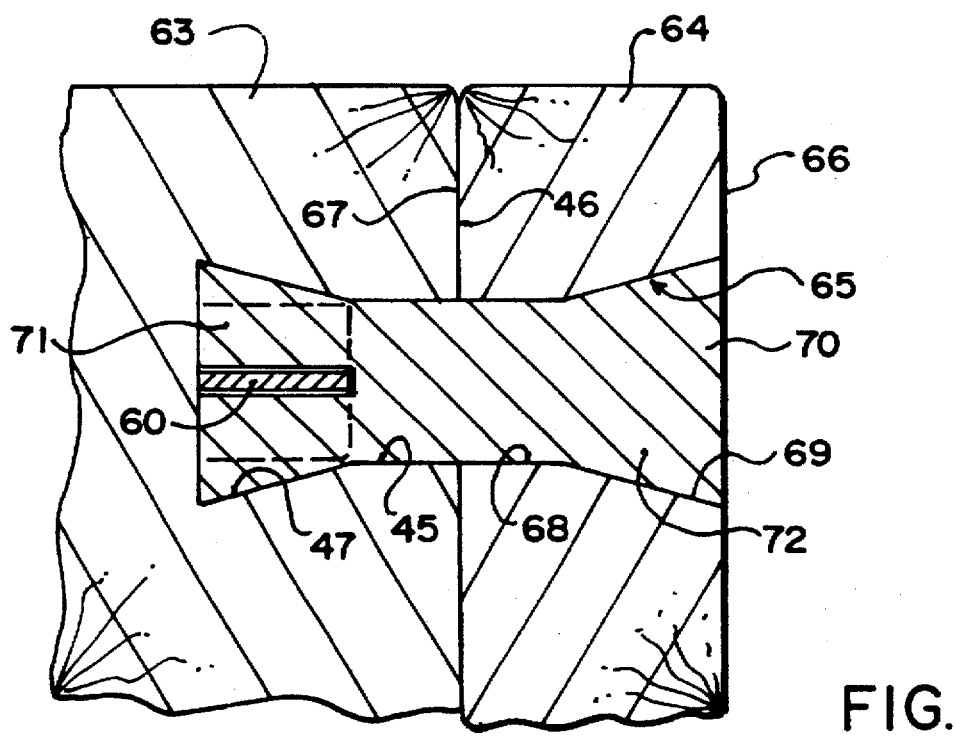
FIG. 13 is a similar cross sectional view through two wooden elements showing a further arrangement of the assembled dowel system.

In a further alterative arrangement shown in FIG. 13 the dowel is formed without a hollow internal bore but is instead simply formed with transverse slits again preferably cut at right angles. These slits are then forced apart by a cross shaped wedge member 60 which is forced axially into the slits so as to drive the end portions of the dowel outwardly by the physical presence of the cross shaped wedge member. In a yet further arrangement shown in FIG. 11, the dowel body indicated at 62 is formed of a compressed material. That compressed material is initially of a shape so as to follow the portions 45 and 47 of the bore. Thus the dowel is initially compressed at its end section to take up a cylindrical shape having a diameter equal to the diameter of the bore 45. The material is further of a type which on contact with moisture from an adhesive material 48 reexpands to its initial position to take up the expanded position to fill the bore portion 47.

An alternative arrangement for attaching to wooden elements 63 and 64 is shown in FIG. 13. In this arrangement a blind hole including the portions 45 and 47 is formed in the element 63. However the element 64 has a hole 65 drilled from an outermost surface 66 through to a surface 67 abutting with the surface 46 of the element 63. This hole is drilled so that it follows the general shape of the blind hole 45, 47 but in this case the hole 65 is not blind but breaks out on both surfaces 66 and 67. The hole 65 thus includes a first portion 68 which is cylindrical and a second portion 69 which is frusto conical tapering inwardly from the surface 66. This action can be carried out by a device substantially in the form of a countersink which can be attached to the rub collar 40 so as to follow the first drilling element 13 into the bore portion 68 with a counter sink type drilling element forming the tapered bore 65.

From this arrangement a dowel 70 can be inserted which has an expanding portion 71 at its inner most end of the type as previously described and a tapered portion 72 at its outermost end which does not need to expand but is instead of fixed frustoconical shape so as to engage into the portion 69 of the bore 65. The dowel thus forms the two frustoconical portions necessary to hold the elements 63 and 64 in abutting position with the necessity only for a single expanding portion 71.

Figure 5:
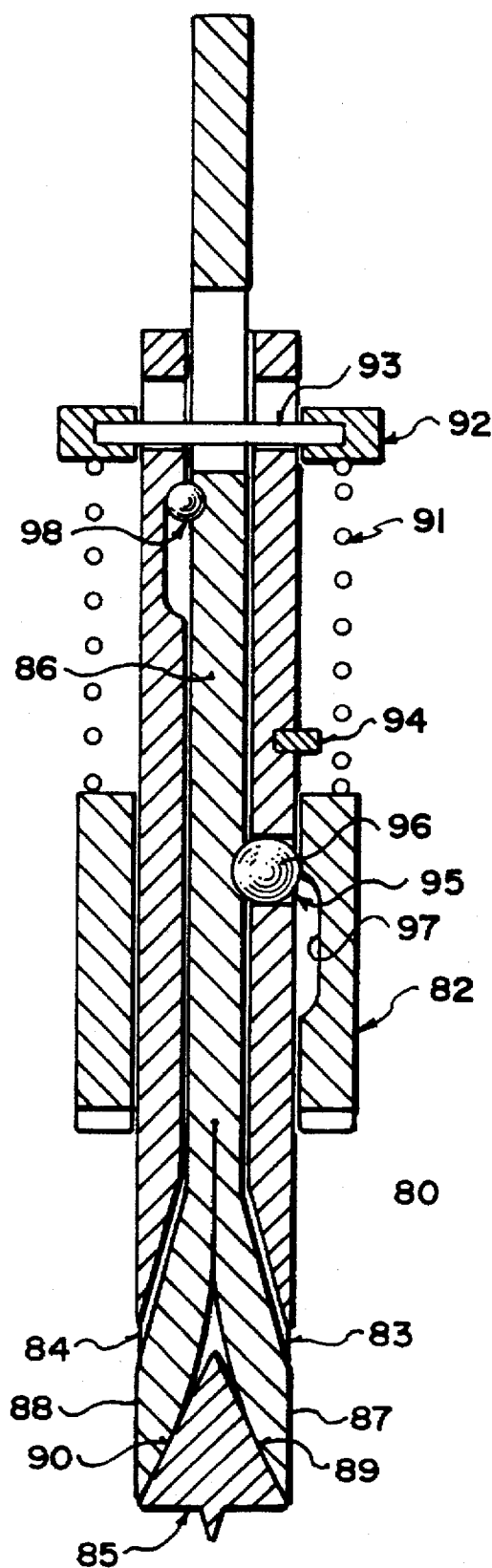
FIG. 5 is a similar vertical cross section through a second embodiment of drilling assembly.

Turning now to FIG. 5 there is shown an alternative arrangement of drilling assembly which is of a similar construction to that of FIGS. 1 through 4. Thus the drilling assembly of FIG. 5 comprises a primary drilling element 80, a secondary drilling element 81 and a rub collar 82 which are coupled together for corotation. In this case the primary drilling element 80 is in the form of a tubular member which has a pair of diametrically opposed openings 83 and 84 adjacent a cutting end 85 thereof. The openings 83 and 84 break out on the side wall of the tubular member spaced just back from the cutting edge 85. The primary element 80 has spiral grooves (not shown) to facilitate waste removal from the bore hole.

Within the hollow centre of the primary element 80 is mounted the secondary drilling element 81 which includes a rod 86 and a pair of springsteel cutter elements 87 and 88 which project from the rod 86 now carried thereby but extend outwardly through the openings 83 and 84 respectively. Each cutter element has a cutting edge extending axially along the element and the position shown in FIG. 5 the cutting edges are retracted within the openings 83 and 84.

Within the end of the primary bit is provided a triangular section including edges 89 and 90 upon which the underside of the cutting members 87,88 sit. It will be appreciated therefore that as the secondary element 81 is moved forwardly the underside of the cutting members 86 and 87 ride outwardly along the surfaces 89 and 90.

The rub collar 82 is connected by a spring 91 to an end plate 92 carrying a cross pin 93 which connects the end plate 92 and the primary drilling element 80. A stop member 94 on the primary drilling element allows longitudinal movement of the rub collar 82 up to a predetermined position at which it hits the stop member 94. A first ball lock 95 including a ball 96 and a groove 97 is located between the primary drilling element and the rub collar to hold the secondary drilling element in fixed position during an initial drilling step. Once the rub collar is moved axially toward the stop 94 the ball lock 95 is released allowing the secondary drilling element to move longitudinally. A second ball lock is indicated at 98.

In operation the drilling element enters the material until the rub collar contacts the upper surface. The rub collar is pushed upwards along the drilling element until it contacts the collar stop 94. In the process this also releases the secondary drilling element ball lock 95 and compresses the return spring 91. When engaged against the stop 94, the rub collar prevents the primary bearing element 80 from entering the material any further. Further force on the drilling assembly therefore presses the secondary drilling element downwardly to travel along the inside of the primary drilling element where it is forced apart at the cutting edge and by the tapered section at a cutting end of the primary drilling element thus causing the edges of the secondary drilling element to cut a gradual taper or undercut in the existing hole. The primary drilling element acts as a pilot as the whole assembly turns in unison.

In an alternative arrangement (not shown) the dowel can be shaped initially to include a an outwardly tapered end portion shaped to follow the shape of the lower portion of the bore. The end portion is then drilled and has transverse slots allowing it to be compressed to pass through he cylindrical portion of the bore. This allows the dowel to be effectively unstressed in the finished condition. A plug can be used as previously described.

Figure 16:
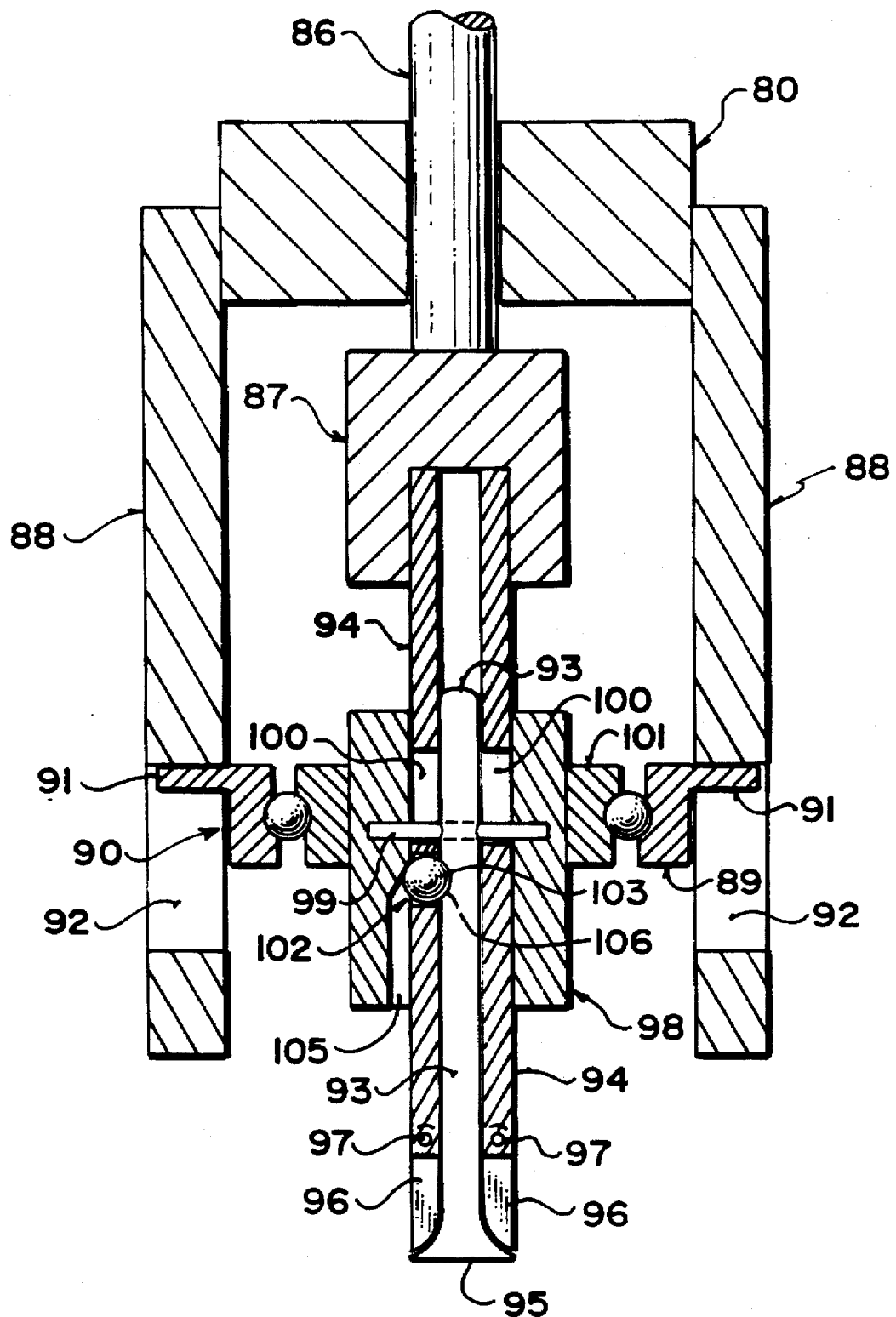
FIGS. 16 and 17 are a schematic vertical cross sectional views through a further embodiment of drilling assembly according to the present invention.
Figure 17:
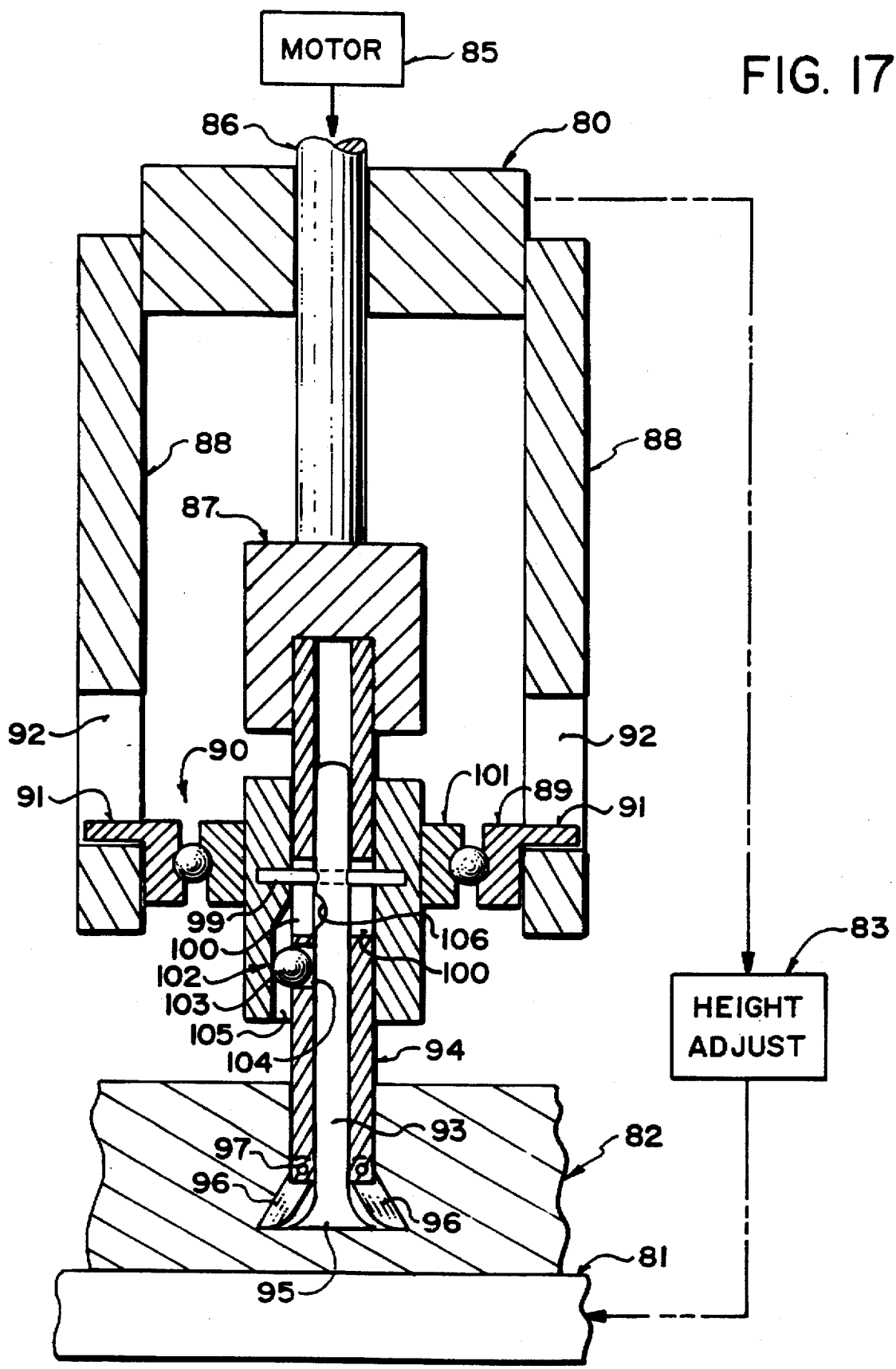

Turning now to the alternative culling assembly shown in FIGS. 16 and 17, the drilling assembly includes a headstock 80 of a press drill which includes a table 81 of the press drill on which a work piece or part 82 is located for drilling. The table 81 is fixed in height relative to the headstock 80 but is adjustable by an adjustment system generally indicated at 83 so that the spacing between the table and the headstock can be adjusted prior to a drilling action occurring. In this way the position of a top surface 84 of the work piece 82 is adjusted relative to the headstock which of course adjusts the depth of action of the drilling assembly.

The headstock 80 carries a motor 85 which drives a vertical main shaft 86 of the press drill. The shaft 86 carries a chuck 87.

The details of the drill press are not shown herein since these are well known to one skilled in the art.

The headstock is modified relative to the conventional press drill by the addition of a pair of depending side arms 88, each on respective side of the chuck 87 and spaced outwardly therefrom. The arms 88 thus extend downwardly toward the work piece 82 and the top surface 84 without reaching that surface. The arms can be replaced by a sleeve fully surrounding the chuck if required for structural stability.

The arms 88 carry an outer ring 89 of a bearing 90. The outer ring 89 includes the flange 91 which projects into a slot 92 in each of the arms so the bearing ring can move upwardly and downwardly relative to the arms.

The drilling assembly further includes an inner bit 93 and an outer bit sleeve 94 which surrounds the inner bit 93. The inner bit comprises a longitudinal shaft co-axial with the shaft 86 and having a cutting element 95 at the lower end. The element 95 flares outwardly from the diameter of the shaft of the bit to form a generally conical upper surface. The lower end of the sleeve 94 carries a plurality of cutting wings 96 at spaced positions around the lower end of the sleeve 94. Each wing 96 is pivotally mounted on a pin 97 carried on the sleeve so that the wings can be retracted to the position shown in FIG. 16 in which the wings have an outer cutting surface which is cylindrical with a diameter substantially equal to the outer cutting edge of the cutting element 95. The wings can also be moved to an extended position shown in FIG. 17 in which the outer surface of the wings is inclined outwardly and downwardly so that the wings lie on a cone having a base defined by the bottom surface of the cutting element 95 and an outer cone wall defined by the outer edges of the wings 96.

The wings 96 are moved from the retracted position shown in FIG. 16 to the extended position shown in FIG. 17 by downward movement of the sleeve 94 relative to the shaft of the inner bit 93.

The drilling assembly further includes a ball lock sleeve 98 which surrounds the outer bit sleeve 94. The ball lock sleeve 98 is spaced upwardly from the lower end of the inner bit 93 by distance sufficient to allow the drilling action through the surface 84 into the part to the required depth. The inner bit 93 is keyed to the ball lock sleeve 98 by a transverse pin 99 which passes through the inner bit 93 and has ends projecting into the sleeve 98 at fixed position therein. The outer bit sleeve 94 is slidable vertically relative to the inner bit 93 and to the ball lock sleeve 98 by way of a pair of slots 100 defined in the outer bit sleeve 94. The ball lock sleeve 98 is carried in an inner ring 101 of the bearing 90 so that it is supported against side to side movement and is allowed to rotate relative to the outer ring 89 and thus to the arms 88.

The outer bit sleeve 94 is locked or keyed to the ball lock sleeve 98 by a ball lock 102 including a ball 103, a recess 104 in the sleeve 94 and a channel 105 in the inside face of the ball lock sleeve 98.

The ball lock is substantially as previously described and acts to lock the sleeve 94 to the inner bit 93 during the initial drilling action. This locking action caused by forcing the ball through the opening 104 in the sleeve 94 into a recess 105 in the shaft of the inner bit 93.

In the initial drilling action, therefore, the pressure on the drilling assembly from the chuck is applied to the sleeve 94 and due to the locking action of the ball in the recess 105 the sleeve 94 and the inner bit 93 are locked together and move commonly downwardly with the chuck. This movement downwards causes common movement with the locking sleeve 98 which thus slides downwardly relative to the arms by movement of the flange 91 in the slots 92.

When the flange 91 reaches the bottom of the slots 92, the ball lock sleeve 98 is prevented from further downwardly movement. The ball lock sleeve therefore moves slightly upwardly relative to the outer bearing sleeve 94 thus releasing the ball from the recess 106 and allowing the ball to fall into the channel 105 so that the locking action of the ball is released and the outer sleeve 94 is free to move downwardly relative to the inner bit 93.

The position that the ball lock sleeve is moved relative to the outer bit sleeve 94 is thus determined by the position of the arms 88 relative to the table 81 which is adjusted by the height adjustment 83. Thus the depth of cut in the initial cutting action can be controlled by adjusting the height of the table 81 and at the end of the initial cutting action the arms operate the ball lock sleeve 98 to release the locking action and to allow the outer sleeve 94 of the bit to move downwardly in the secondary cutting action to form the second portion of the ball.

This operation of the ball lock sleeve 98 to release the locking action is effected without the necessity for any element contacting the surface 84 so that the surface is not marred by any buffing or grinding action.

Turning now to FIGS. 14A through 14E and 15, there is shown a dowel assembly 110 for connecting two parts 111 and 112 of a material to be coupled together. Each of the parts 111 and 112 is drilled using the drilling assemblies previously described to form a blind bore having a first part 113 and a second part 114. The first part is cylindrical and the second part 114 is frusto-conical with the base 115 and a conical wall extending from the base tapering inwardly to the diameter of the cylindrical portion 113.

In an initial step of the assembly process, therefore, each of the parts is drilled to form the blind holes as described.

The dowel assembly 110 includes a dowel 116 and a plug member 117.

The dowel is shaped with a cylindrical portion 118 which has a length sufficient to provide first portions 119 and 120 which are associated with the first portions of the drilled holes of the two parts. The dowel further includes two second portions 121 and 122 which are frustro-conical in outer surface with a frusto-conical shape substantially exactly matching that of the drilled second portion 114. Thus the radius of curvature of each second portion along the length of the second portion is substantially equal to the radius of curvature of the second portion of the drilled hole at the same position as along its length.

The dowel with the first and second portions thus formed has a central bore 123 drilled through the dowel of a constant diameter. The second portions 121 and 122 then have a plurality of transverse cuts 124 formed thereacross which divide the second portion into a plurality of angularly spaced pieces 125. In the example shown in FIG. 15 there are four such cuts thus dividing the second portion 121 into four pieces 125 each forming a part of circle.

The width of the cuts 124 is arranged so that the parts 125 can be compressed inwardly by bending the parts about a position adjacent the base 126 of the cuts which is aligned with the bottom of the second portion so that the diameter of the second portion is compressed to take up an outside diameter equal to the diameter of the cylindrical portion 118.

The plug member 117 includes two heads 128 and 129 together with a central portion 130 between the heads which is of reduced diameter relative to the heads. Each of the heads has a diameter equal to that of the bore 123 and a length equal to the length of the second portion. The length of the plug member is such that it is equal to the length of the dowel so that when inserted, the ends of the plug member are coterminous with the ends of the dowel and each of the heads lies inside a respective one of the second portions 121 and 122 of the dowel.

The assembly of the two parts 111 and 112 with the dowel 116 and the plug member 117 can be seen by following the steps shown in FIGS. 14A through 14B.

Thus in the first step 14B the plug member is inserted into the dowel so that it takes up a position with the head 128 inside the first portion 120 that is spaced out of its associated second portion 122. The second head 129 is positioned outwardly beyond the end of the dowel.

With the dowel 116 and the plug 117 in this position, the dowel can be inserted into the part 112 by forcing the second portion 122 of the dowel through the first portion of the whole by compressing the second portion 122 inwardly. It is free to compress inwardly since the head 128 is removed from its interior. This step is shown in FIG. 14C where the dowel is in place following which the second portion 122 expands outwardly to fill the second portion of the hole due to its normal elasticity and the outside surface of the portions 125 lie in contact with the inner surface of the second portion of the bore.

As shown in FIG. 14D, the second part 111 is placed over the second end of the dowel with the head 129 projecting into the second portion of the bore of the second part 111. In this position the second portion 121 is forced partly through the first portion 113 of the bore.

The final step is shown in FIG. 14E in which the parts 111 and 112 are pressed together and this in one stroke pushes the second portion 121 of the dowel into the second portion 114 of the bore, forces the head 129 into the bore 123 in alignment with the second portion 121 and forces the head 128 into the second portion 122. The dowels are thus expanded into the second portions of the bore and the heads lock those dowel portions against compression.

The use of a dowel which is shaped to substantially exactly match the inside surface of the bore in the frustro-conical second portion has the advantage that the curvatures of the second portions of the dowel closely match or are exactly equal to the curvature of the second portion of the bore so that the adhesive applied to lock the system in place does not need to bridge differences in curvature.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method of fastening a dowel to an element of a solid material comprising:

providing a first portion of the solid material having a surface thereof;

drilling a blind hole in the surface of the material, the blind hole having a second hole portion spaced from the surface which is of a diameter greater than that of a first hole portion thereof adjacent the surface;

inserting an end of the dowel into the blind hole through the surface, the end of the dowel having a diameter as it passes through the first hole portion substantially equal to that of the first hole portion;

causing a part of the end of the dowel to expand radially into the second hole portion;

wherein the first and second hole portions are drilled in the material in a single drilling action from the surface of the material by the steps of:

providing a drilling assembly having thereon a first drilling element and a second drilling element each for common rotation with the drilling assembly, the second drilling element being movable relative to the first drilling element in response to pressure applied longitudinally to the drilling assembly;

rotating the drilling assembly;

applying pressure longitudinally to the drilling assembly while locking the second drilling element against said movement relative to the first drilling element by a rigid locking member, such that the pressure and rotation applied to the drilling assembly causes the first drilling element to effect cutting of a cylindrical hole defining said first hole portion by engagement of the material with the first drilling element;

providing an actuating member on the drilling assembly, the rigid locking member in a locking position being held by the actuating member in engagement with a first surface fixed on the first drilling element and a second surface fixed on the second drilling element so as to hold the first and second drilling elements in common fixed position, the actuating member being moveable relative to the first and second surfaces; and operating the actuating member after drilling the cylindrical hole to a predetermined depth to cause said movement of the actuating member relative to the first and second surfaces to release the locking member from said engagement with one of said first and second surfaces to allow said second drilling element to be moved by said longitudinal pressure to a position to cut from said cylindrical hole said second hole portion.

2. The method according to claim 1 wherein the second drilling element is moved axially of the first drilling element, the axial movement thereof causing outward movement of the second drilling element in a radial direction to form said second hole portion.

3. The method according to claim 1 wherein the first drilling element includes side surfaces thereof engaging the second drilling element, the side surfaces being tapered outwardly and longitudinally so that said axial movement of the second drilling element causes the second drilling element to be forced outwardly by engagement with the side surfaces of the first drilling element.

4. The method according to claim 1 wherein the actuating member is actuated by engagement with the surface of the material.

5. The method according to claim 1 wherein the actuating member is actuated without engaging the surface of the material.

6. The method according to claim 1 wherein the actuating member is actuated by an element located in fixed position relative to a support for the material.

7. The method according to claim 6 wherein the material is supported on a table which is adjustable in height relative to a headstock for the drilling assembly, wherein the table is in fixed position relative to the headstock while the drilling is effected and wherein the element for operating the actuating member is attached to the headstock.

8. The method according to claim 7 wherein the element extends downwardly from the headstock to lie alongside the drilling assembly and wherein there is provided a bearing between the element and the drilling assembly which can move vertically relative to the element.

9. The method according to claim 1 wherein the dowel is shaped with a first portion and a second portion such that, in an initial condition of the dowel, the first and second portions of the dowel are substantially equal in outside shape to an inside surface of the first and second portions of the hole, wherein the dowel is shaped to form a bore therealong at least in the second portion and a plurality of angularly separated parts of the second portion and wherein the second portion of the dowel is radially inwardly compressed when inserted through the first portion of the hole and is radially outwardly expanded when the second portion of the dowel is in the second portion of the hole with insertion of a plug into the bore.

10. The method according to claim 1 including:
providing a second portion of the solid material having a surface thereof;
drilling a blind hole in the surface of the second portion, the blind hole having a second hole portion spaced from the surface which is of a diameter greater than that of a first hole portion thereof adjacent the surface;
shaping each end of the dowel with a first portion and a second portion such that, in an initial condition of the dowel, the second portions of the dowel are of greater outside size than the first portions;
shaping the dowel to form a bore therealong;
shaping the dowel to form a plurality of angularly separated parts of each of the second portions such that the second portion of the dowel is radially inwardly compressible for insertion through the first portion of the hole;
providing an elongate plug member for extending along the full length of the dowel which has a first head at one end for insertion into a respective second portion of one end of the dowel, a second head at an opposed end for insertion into a respective second portion of the other end of the dowel and a portion between the heads which is of reduced transverse dimensions relative to the heads;
inserting the plug member into the dowel such that one of the heads is located inside the dowel spaced axially from the respective second portion at one end of the dowel and the other of the heads is located outside the dowel beyond the other end thereof;
inserting said one end of the dowel into the first part of the material while compressing the second portion of the dowel into the location beyond the end of the plug member;
inserting said other end of the dowel into the second part of the material while compressing the second portion of the dowel into the location adjacent the portion of reduced diameter;
and moving the plug member axially relative to the dowel such that the heads each move to a position inside the respective second portion.

11. A drilling assembly for drilling a blind hole in a material from a surface of the material, the blind hole having a second hole portion spaced from the surface which is of a diameter greater than that of a first hole portion thereof adjacent the surface, the drilling assembly comprising:
a drilling assembly body having a first drilling element and a second drilling element each arranged for common rotation with the drilling assembly body;
means mounting the second drilling element on the body for movement relative to the first drilling element in response to pressure applied longitudinally to the drilling assembly body;
chuck means for grasping the drilling assembly body for rotating the drilling assembly body and for applying pressure longitudinally to the drilling assembly body;
means locking the second drilling element against said movement relative to the first drilling element such that the pressure and rotation applied to the drilling assembly causes the first drilling element to effect cutting of a cylindrical hole defining said first hole portion by engagement of the material with the first drilling element;
an actuating member mounted on the drilling assembly body at a position thereon arranged for engaging the first surface of the material after drilling the cylindrical hole to a predetermined depth;
the rigid locking member in a locking position being held by the actuating member in engagement with a first surface fixed on the first drilling element and a second surface fixed on the second drilling element so as to hold the first and second drilling elements in common fixed position;
the actuating member being moveable relative to the first and second surfaces;
said actuating member being arranged such that drilling of the first portion to a predetermined depth causes said movement of the actuating member relative to the first and second surfaces to release the locking member from said engagement with one of said first and second surfaces to allow said second drilling element to be moved by said longitudinal pressure to a position to cut from said cylindrical hole said second hole portion.

12. The drilling assembly according to claim 11 wherein the second drilling element is moved axially of the first drilling element, the axial movement thereof causing outward movement of the second drilling element in a radial direction to form said second hole portion.

13. The drilling assembly according to claim 11 wherein the first drilling element includes side surfaces thereof engaging the second drilling element, the side surfaces being tapered outwardly and longitudinally so that said axial movement of the second drilling element causes the second drilling element to be forced outwardly by engagement with the side surfaces of the first drilling element.

14. The drilling assembly according to claim 11 wherein the actuating member comprises a sleeve surrounding the first and second drilling elements.

15. The drilling assembly according to claim 11 wherein the locking member comprises a ball positioned inside the sleeve.

16. The drilling assembly according to claim 11 wherein the actuating member is actuated by engagement with the surface of the material.

17. The drilling assembly according to claim 11 wherein the actuating member is actuated without engaging the surface of the material.

18. The drilling assembly according to claim 11 wherein the actuating member is actuated by an element located in fixed position relative to a support for the material.

19. The drilling assembly according to claim 18 wherein the material is supposed on a table which is adjustable in height relative to a headstock for the drilling assembly, wherein the table is in fixed position relative to the headstock while the drilling is effected and wherein the element for operating the actuating member is attached to the headstock.

20. The drilling assembly according to claim 19 wherein the element extends downwardly from the headstock to lie alongside the drilling assembly and wherein there is provided a bearing between the element and the drilling assembly which can move vertically relative to the element.

21. A method of fastening a dowel to a part of a solid material comprising:

providing a first part of the solid material having an outside surface thereof;

drilling a blind hole in the outside surface of the first part, the blind hole having a first hole portion thereof adjacent the outside surface, which has an inside surface which is cylindrical, and a second hole portion spaced from the surface which has an inside surface which is substantially frusto-conical increasing in diameter from a first diameter equal to that of the first portion to a second diameter which is greater than the first diameter;

providing a dowel which is shaped with a first portion and a second portion corresponding to the first and second hole portions respectively, the dowel being shaped and arranged such that, in an initial, relaxed condition of the dowel, the first and second portions of the dowel each have an outside surface which is substantially equal in outside shape to the inside surface of the first and second portions of the hole;

the dowel having a bore therealong;

the dowel being formed so as to define a plurality of angularly separated parts at the second portion allowing the second portion to be compressed radially inwardly;

compressing the second portion radially inwardly so that the second portion is substantially cylindrical with a diameter substantially equal to the first diameter;

with the second portion compressed, inserting an end of the dowel into the blind hole through the outside surface;

allowing the second portion of the dowel to expand to its initial, relaxed condition radially outwardly into the second hole portion;

and providing a plug which is inserted into the bore at the expanded second portion so as to provide a head of the plug at the second portion so that the second portion is prevented by the head from being compressed radially inwardly.

22. A method of fastening a dowel to a first and a second part of a solid material comprising:

providing a first part of the solid material having an outside surface thereof;

drilling a blind hole in the outside surface of the first part, the blind hole having a first hole portion thereof adjacent the outside surface, which has an inside surface which is cylindrical, and a second hole portion spaced from the surface which has an inside surface which has a part thereof which is of a second diameter which is greater than the first diameter;

providing a second part of the solid material having an outside surface thereof;

drilling a blind hole in the outside surface of the second part, the blind hole having a first hole portion thereof adjacent the outside surface, which has an inside surface which is cylindrical, and a second hole portion spaced from the surface which has a part thereof which is of a second diameter which is greater than the first diameter;

providing a dowel having a first end and a second end for cooperation respectively with the blind holes in the first and second parts, each end being shaped with a first portion and a second portion corresponding to the first and second hole portions respectively, the dowel being shaped and arranged such that, in an initial, relaxed condition of the dowel, the first and second portions of the dowel each have an outside surface which is shaped to co-operate with the inside surface of the first and second portions of the hole;

the dowel having a cylindrical bore therealong;

the dowel being formed so that the second portion of each end is defined by a plurality of angularly separated parts allowing the second portion of each end to be compressed radially inwardly;

providing an elongate plug member for extending along the full length of the dowel;

providing on the plug member a first head at one end for insertion into the cylindrical bore at a respective second portion of one end of the dowel, a second head at an opposed end for insertion into the cylindrical bore at a respective second portion of the other end of the dowel, the heads each having an outer diameter matching that of the cylindrical bore, and a portion between the heads which is of reduced transverse dimensions relative to the diameter of the heads;

compressing the second portion of the first end radially inwardly so that the second portion is substantially cylindrical with a diameter substantially equal to the first diameter;

with the second portion of the first end compressed, inserting the first end of the dowel into the blind hole in the first part through the outside surface;

allowing the second portion of the first end of the dowel to expand radially outwardly into the second hole portion of the first part;

locating the plug member in the dowel such that one of the heads is located inside the bore in the dowel spaced axially from the respective second portion at the first end of the dowel and the other of the heads is located outside the dowel beyond the second end thereof;

compressing the second portion of the second end radially inwardly so that the second portion is substantially cylindrical with a diameter substantially equal to the first diameter;

with the second portion of the second end compressed, causing insertion of the second end of the dowel into the blind hole in the second part through the outside surface and allowing the second portion of the second end of the dowel to expand radially outwardly into the second hole portion of the second part;

said insertion causing movement of the plug member axially relative to the dowel such that the first and second heads each simultaneously move to a position inside the respective second portion of the first and second ends so that each second portion is prevented from being compressed radially inwardly.

23. The method according to claim 22 wherein the outside surface of the second portion of each of the first and second ends is shaped in the initial, relaxed condition of the dowel so as to follow substantially exactly the inside surface of the respective second portions of the first and second blind holes, each of which is substantially frusto-conical.

* * * * *